United States Patent Office 3,384,683
Patented May 21, 1968

3,384,683
PHOSPHORUS SUBSTITUTED AROMATIC UREAS
Werner Schwarze, Frankfurt am Main, Germany, assignor to Deutsche Gold- und Silber-Scheideanstalt vormals Roessler, Frankfurt am Main, Germany
No Drawing. Filed Feb. 26, 1965, Ser. No. 435,726
Claims priority, application Germany, Feb. 29, 1964, D 43,775
2 Claims. (Cl. 260—938)

ABSTRACT OF THE DISCLOSURE

Plant growth regulating (herbicidal) compounds of the formula

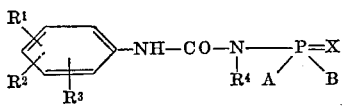

in which each of the $R^1$, $R^2$ and $R^3$ is hydrogen, halogen, alkyl or nitro, $R^4$ is lower alkyl, X is O or S and each of A and B is alkyl amino or alkoxy and their preparation by reacting the corresponding phenyl isocyanate with a compound of the formula

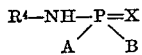

---

The present invention relates to novel plant growth regulating compounds, a process for their production as well as their use for the regulation of the growth of plants, especially, as herbicides.

The novel compounds are of the following formula:

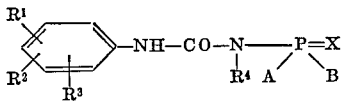

in which each of $R^1$, $R^2$ and $R^3$ are hydrogen, halogen, preferably, chlorine, alkyl, preferably, of 1 to 4 carbon atoms, or nitro, $R^4$ is lower alkyl, preferably, with 1 to 4 carbon atoms, X is oxygen or sulfur and each of A and B is alkyl amino, such as mono- and dialkyl amino or alkoxy, preferably those where the alkyl is of 1 to 4 carbon atoms.

The new urea compounds are capable of influencing the growth of plants even at very low concentrations. In suitable quantitles they can be used for the eradication of the plants. Furthermore, depending upon the nature of substituents $R^1$ to $R^4$, X and A and B, they can be used for the eradication or suppression of weeds in cultivated plants or for the complete annihilation and hindering of the undesired plant growth. Under some circumstances they also can be used for influencing plant growth, such as, for example, defoliation, decrease of fruit set, delay of flowering. The compounds according to the invention in addition to being useful for influencing growing plant growth can also be used for the sterilization of the soil. They can be used alone or in combination with each other as well as in combination with other herbicidal substances. In addition, they also may be combined with insecticides, fungicides or fertilizers.

The novel compounds mostly are oils which only exhibit a slight tendency to crystallize. They are insoluble in water and in part have good solubility in organic solvents such as acetone, cyclohexanone, isophorone, benzene, toluene, chloroform, tetrahydrofurane, dioxane, alcohols, diesel oil, vegetable oils and the like. Mixtures of such solvents can also be used.

The solutions of the compounds according to the invention in inert solvents which are miscible with water can be mixed with water whereby such compounds precipitate out in liquid form producing emulsions. Such emulsions can be stabilized with known emulsion stabilizers.

The compounds furthermore can be supported on solid carriers to provide compositions which are of easier application. Suitable solid carriers for instance are: clay, kaolin, kieselguhr, bentonite, talcum, finely ground calcium carbonate, wood charcoal, wood meal and the like.

The active compounds can be mixed with the carriers in dry form. It also is possible to spray solutions or emulsions thereof onto the carriers or to mix such solutions or emulsions with the carriers and subsequently drying the mixtures. Known stickers, such as, glue, casein, alginic acid salts and similar materials can be used in order to provide for better adhesion of the active compounds on the carriers.

It furthermore is possible to mix the new compounds, if desired, in conjunction with carriers, with suspending agents and stabilizers to form a paste or powder which forms a suspension when mixed with water.

Known surface active anionic, cationic or non-ionic substances can be used as the wetting agents, emulsifiers and stabilizers, such as, for example, turkey red oil, fatty acid salts, alkyl-aryl sulfonates, secondary alkyl sulfates, resin acid salts, polyethylene ethers of fatty alcohols, fatty acids or fatty amines, quarternary ammonium compounds, lignin sulfonic acids, saponin, gelatin, casein either singly or in combination.

The novel compounds according to the invention can be prepared by reacting a compound of the formula

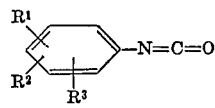

with a compound of the formula

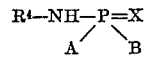

in which $R^1$—$R^4$, X and A and B have the same significance as above. Preferably such reaction is carried out in the presence of an inert solvent at a temperature between 20° and 150° C., especially, between 80° and 140° C.

The progress of the reaction is slower at lower temperatures than at higher temperatures, so that in general it is more advantageous to carry out the reaction at a temperature in the upper end of the temperature range. The reaction, for example, can be carried out by dissolving the starting materials in an inert organic solvent, preferably in a hydrocarbon or chlorinated hydrocarbon, such as toluene, xylene or chlorobenzent and then boiling the reaction mixture under reflux. The reaction, depending upon the type of starting compounds, is completed in about 6 to 12 hours.

The following examples will serve to illustrate the present invention with reference to several specific embodiments thereof.

EXAMPLE 1

3 - (p - chlorophenyl) - 1 - methyl - 1 - dimethylthiophosphonyl-urea

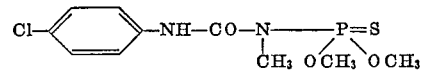

15.35 g. of p-chlorophenylisocyanate and 15.5 g. of methylamido dimethylthionophosphate were dissolved in 125 cc. of toluene and such solution was then boiled under reflux for 6 hours. After this amount of time no further isocyanate could be detected in the reaction mixture. The reaction was then filtered and boiled down under vacuum. 29.6 g. of a light brown oil remained as residue.

*Analysis.*—(Percent) $C_{10}H_{14}N_2O_3PSCl$: calculated, N, 9.1; S, 10.3; Cl, 11.5; P, 10.0 (mol. wt.=308.5); found: N, 9.3; S, 10.1; Cl, 11.7, P, 9.8. Yield=96.2% of theory.

EXAMPLE 2

3-(p-tolyl)-1-i-propyl-1-dimethylphosphonyl-urea

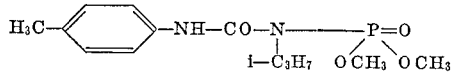

13.3 g. of p-tolyl isocyanate and 16.1 g. of i-propyl amido dimethyl phosphate were dissolved in 150 cc. of benzene and the solution boiled for 8 hours under reflux. The reaction mixture was cooled down, washed with water, dried with $Na_2SO_4$, filtered and boiled down under vacuum. 28.0 g. of a light yellow oil remained as a residue.

*Analysis.*—(Percent) $C_{13}H_{21}N_2O_4P$: Calculated, N, 9.5; P, 10.54, (mol. wt.=294); found: N, 9.35; P, 10.4. Yield=95.3% of theory.

EXAMPLE 3

3 - (p - chlorophenyl) - 1 - ethyl - 1 - (bisdimethylaminophosphonyl)-urea

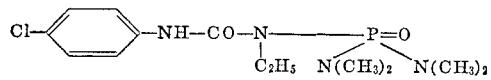

15.35 g. of p-chlorophenyl isocyanate and 17.9 g. of ethylamido-bis-dimethylamino-phosphate were dissolved in 200 cc. of toluene and the solution boiled 12 hours under reflux. The resulting yellow solution was cooled down, washed, dried and boiled down under vacuum. 26.7 g. of a light brown oil which slowly crystallized on standing remained as a residue.

*Analysis.*—(Percent) $C_{13}H_{22}N_4O_2ClP$: Calculated, N, 16.85; Cl, 10.65; P, 9.3, (mol. wt.=332.5); found: N, 16.8; Cl, 10.7; P, 9.3. Yield=80.3% of theory.

EXAMPLE 4

3 - (3,4 - dichlorophenyl) - 1 - ethyl - 1 - (bis - dimethylamino-thiophosphonyl)-urea

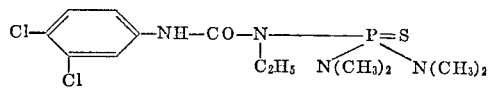

18.8 g. of 3,4-dichlorophenyl isocyanate and 19.5 g. of ethyl-amido-bis-dimethylamino-thionophosphate were dissolved in 150 cc. of chlorobenzene and the solution boiled 6½ hours under reflux. After processing of the reaction solution as in the previous examples, 30.1 g. of a light brown oil remained as a residue.

*Analysis.*—(Percent) $C_{13}H_{21}N_4OCl_2PS$: Calculated, N, 14.6; S, 8.35; Cl, 18.55; P, 8.1, (mol. wt.=383); found: N, 14.5; S, 7.8; Cl, 18.47; P, 8.24. Yield=78.7% of theory.

3 - (3 - nitrophenyl) - 1 - methyl - 1 - bis - diethylaminophosphonyl) - urea, 3 - phenyl - 1 - i - propyl - 1 - (bis-dimethylaminothiophosphonyl) - urea, 3 - (3,4 - dichlorophenyl) - 1 - methyl - 1 - diethylphosphonyl - urea and 3 - (p - chlorophenyl) - 1 - methyl - 1 - (bis - di - i - propylaminothiophosphonyl)-urea were prepared analogously using the starting materials corresponding thereto.

The following four examples illustrate compositions according to the invention suitable for the regulation of plant growth. The proportions are by weight.

EXAMPLE 5

10 parts of 3-(3-nitrophenyl)-1-methyl-1-(bis-diethylaminophosphonyl)-urea, 89 parts of bentonite and 1 part of a finely divided pyrogenic silica (Cabosil) were ground in a ball mill to produce a powder of extreme fineness suitable as a dusting powder.

EXAMPLE 6

A mixture of 10 parts of 3-phenyl-1-i-propyl-1-(bis-dimethylaminothiophosphonyl)-urea and 90 parts of kieselguhr was ball milled until a fine powder suitable as a dusting powder was obtained.

EXAMPLE 7

20 parts of 3-(3,4-dichlorophenyl)-1-methyl-1-diethylphosphonyl-urea, 90 parts of dimethyl formamide and 10 parts of nonyl phenoxy polyoxy ethylene ethanol were thoroughly mixed. The resulting mixture upon admixture with water gives a stable emulsion.

EXAMPLE 8

A mixture of 25 parts of 3-(p-chlorophenyl)-1-methyl-1-(bis-di-i-propylaminothiophosphonyl)-urea, 50 parts of cyclohexanone, 15 parts of xylene and 10 parts of substituted naphthalene disulfonic acid. Such mixture upon admixture with water gives a stable emulsion.

EXAMPLE 9

The herbicidal effectiveness of the novel compounds according to the invention is exemplified by the following Tests 1, 2 and 3 carried out with A) 3-(3,4-dichlorophenyl - 1 - ethyl - 1 - (bis - dimethylaminophosphonyl)-urea and B) 3-(3-chlorophenyl)-1-methyl-1-(bis-dimethylaminophosphonyl)-urea.

(1) Pre emergence soil treatment: Various seed were raked into soil contained in plastic flats kept in a greenhouse maintained at 21° C. watered in the first morning with water and treated in the first afternoon with a dispersion obtained by mixing an acetone solution of the active substance with an equal quantity of water. Thereafter the flats were watered normally and the sprouting observed and two weeks after seeding they were examined to see whether and to what extent the plant growth was suppressed.

(2) Post emergence soil treatment: The above procedure was followed except that the aqueous dispersion of the active substance was not applied to the soil until after the seeds had sprouted and the examination as to plant growth suppression was two weeks after the sprouting rather than after the seeding.

(3) Post emergence foliage treatment: The procedure under (2) was repeated except that the aqueous dispersion of the active substance was applied to the foliage of the sprouted plants rather than to the soil.

The results of the tests are given in the following Table I. The numerical values given in Table I signify the quantity of active substance required, expressed in kg. per hectare, to repress 50% of the plant growth.

TABLE I

|  | Pre emergence soil treatment | | Post emergence soil treatment | | Post emergence foliage treatment | |
| --- | --- | --- | --- | --- | --- | --- |
|  | A | B | A | B | A | B |
| Corn | >10 | >10 | >20 | >20 | 3.0 | 10.6 |
| Oats | >10 | >10 | >20 | 13.2 | 1.6 | 1.5 |
| Rye Grass | 8.5 | >10 | 8.1 | >20 | <1.0 | 3.6 |
| Peas | >10 | >10 | >20 | >20 | <1.0 | 1.5 |
| Flax | >10 | >10 | >20 | >20 | <1.0 | 3.2 |
| Mustard | 1.3 | <1.0 | 12.3 | 13.1 | <1.0 | <1.0 |
| Sugar Beet | 6.6 | <10 | 17.3 | 18.8 | <1.0 | <1.0 |

I claim:

1. A urea compound of the formula:

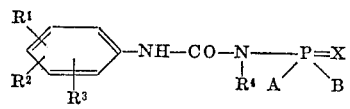

in which each of $R^1$, $R^2$ and $R^3$ are selected from the group consisting of hydrogen, chlorine, lower alkyl and nitro, $R^4$ is lower alkyl, X is selected from the group consisting of sulfur and oxygen and each of A and B are selected from the group consisting of lower alkyl amino and lower alkoxy.

2. A method of producing a compound of the formula

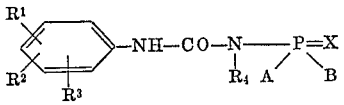

in which each of $R^1$, $R^2$ and $R^3$ are selected from the group consisting of hydrogen, chlorine, lower alkyl and nitro, $R^4$ is lower alkyl, X is selected from the group consisting of sulfur and oxygen and each of A and B are selected from the group consisting of lower alkyl amino and lower alkoxy which comprises reacting a compound of the formula

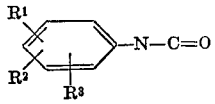

with a compound of the formula

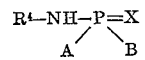

in which $R^1$—$R^4$, X, A and B have the same significance as above dissolved in an inert organic solvent at a temperature between 20 and 150° C.

References Cited

UNITED STATES PATENTS 2,965,668   12/1960   Tolkmith _____ 260—984 XR

OTHER REFERENCES

Kabachnik et al., "Chemical Abstracts," vol. 49, p. 14664 (1955).

CHARLES A. PARKER, *Primary Examiner.*

A. H. SUTTO, *Assistant Examiner.*